United States Patent [19]
Drori

[11] Patent Number: 6,028,505
[45] Date of Patent: Feb. 22, 2000

[54] ELECTRONIC VEHICLE SECURITY SYSTEM WITH REMOTE CONTROL

[75] Inventor: Ze'ev Drori, Los Angeles, Calif.

[73] Assignee: Clifford Electronics, Inc., Chatsworth, Calif.

[21] Appl. No.: 08/622,357

[22] Filed: Mar. 27, 1996

[51] Int. Cl.$^7$ .................................................. B60R 25/10
[52] U.S. Cl. .......................... 340/426; 340/429; 340/331; 307/10.2; 180/173; 180/287
[58] Field of Search ..................................... 340/426, 429, 340/825.81, 825.52, 825.69, 825.72, 330, 331, 332, 333, 473, 438, 471; 307/10.2, 10.3; 180/173, 287; 455/127, 38.3, 343

[56] References Cited

U.S. PATENT DOCUMENTS

| | | | |
|---|---|---|---|
| 4,383,242 | 5/1983 | Sassover et al. | 340/64 |
| 4,438,426 | 3/1984 | Adkins | 340/426 |
| 4,633,240 | 12/1986 | Guim et al. | 340/638 |
| 4,845,464 | 7/1989 | Drori et al. | 340/429 |
| 4,887,064 | 12/1989 | Drori et al. | 340/426 |
| 4,922,224 | 5/1990 | Drori et al. | 340/428 |
| 4,996,515 | 2/1991 | Schaffer et al. | 340/426 |
| 5,079,538 | 1/1992 | DeFino et al. | 340/426 |
| 5,146,215 | 9/1992 | Drori | 340/825.32 |
| 5,196,842 | 3/1993 | Gomez et al. | 340/825.44 |
| 5,258,741 | 11/1993 | Fuller | 340/426 |
| 5,334,969 | 8/1994 | Abe et al. | 340/426 |
| 5,467,070 | 11/1995 | Drori et al. | 340/426 |
| 5,479,156 | 12/1995 | Jones | 340/825.31 |
| 5,534,845 | 7/1996 | Issa et al. | 340/425.5 |
| 5,543,776 | 8/1996 | L'Esperance et al. | 340/426 |

FOREIGN PATENT DOCUMENTS

| | | | |
|---|---|---|---|
| 0202900 A2 | 11/1986 | European Pat. Off. | G08B 13/12 |
| 2175425 | 11/1986 | United Kingdom | G08B 13/00 |
| 2189031 | 10/1987 | United Kingdom | G08B 13/00 |
| 2202942 | 10/1988 | United Kingdom | G01H 3/10 |

*Primary Examiner*—Daniel J. Wu
*Attorney, Agent, or Firm*—Larry K. Roberts

[57] ABSTRACT

A multifunction vehicle security system, which includes a receiver connected to a control unit which processes received information and enables various functions. The user can increase or decrease the sensitivity of the system sensor, by merely pressing a button on the remote control to increase the sensor sensitivity, and another button to decrease the sensitivity. A special programming mode resets the system programmable features and values to factory settings, to quickly re-establish to a known state all or only preselected features. The system provides automatic silencing during night conditions of the system's arming/disarming chirping to confirm the change of system state. The security system generates a door unlocking command to the vehicle's power door locking system to unlock the doors in the event of a vehicle collision. A theft warning LED energy management system conserves battery power when the vehicle is left unattended for long periods of time. When the system is armed, a timer is started, and upon expiration of a time period, the LED activation duty cycle will be reduced from an initial duty cycle. The polarity of the door locking and unlocking signals is programmable, enabling the installer to match the polarity requirements of a particular vehicle. An enhanced panic mode is provided, wherein the vehicle doors are automatically unlocked if the vehicle ignition switch is off, or if the vehicle ignition switch is on, the doors will be automatically locked. The system provides installer programmability of the normally open/closed mode for the vehicle starter, ignition, and/or fuel pump disable relays.

11 Claims, 11 Drawing Sheets

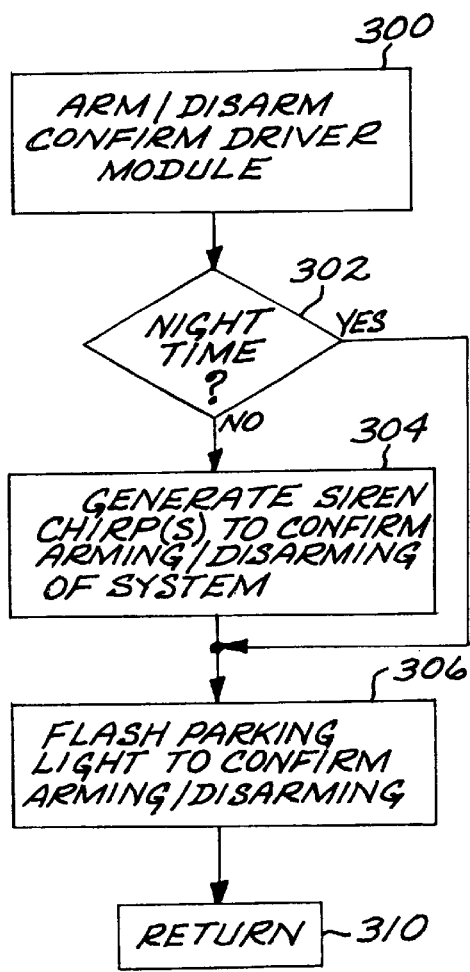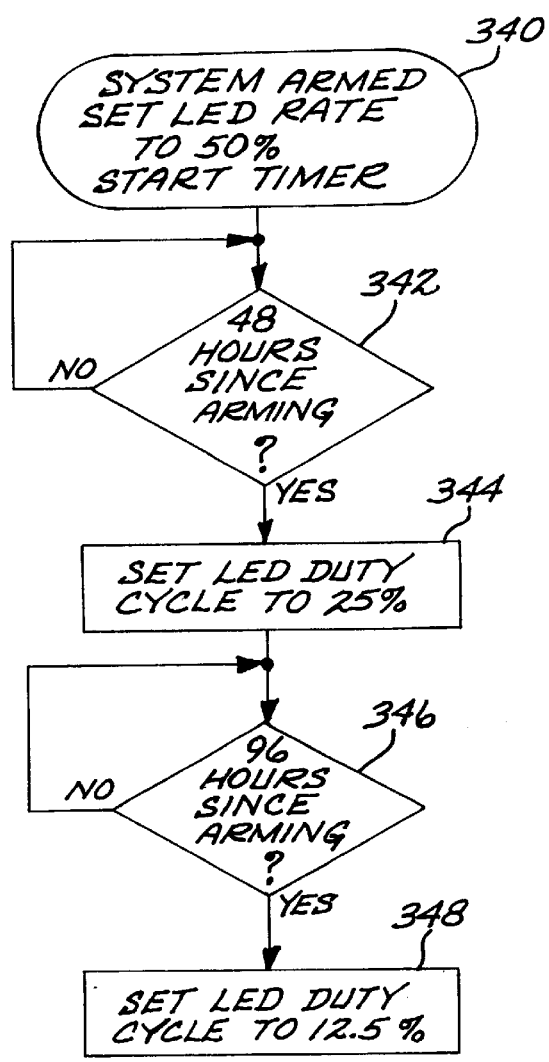
FIG. 10
FIG. 12

ELECTRONIC VEHICLE SECURITY SYSTEM WITH REMOTE CONTROL

TECHNICAL FIELD OF THE INVENTION

This invention relates to vehicle security systems, and more particularly to an electronic vehicle security system with remote control for performing various functions.

BACKGROUND OF THE INVENTION

Vehicle security systems employ sensors to detect intrusion attempts. Typically, any combination of four types of sensors are used with a vehicle security system, vibration and/or impact sensors, microwave sensors, glass breakage sensors and ultrasonic sensors. Any of these sensor types may have more than a single detection zone, however their common shortcoming is that the sensitivity of each sensor is set only by the installer. Yet subsequent to the last sensitivity setting, various conditions such as continuous vibrations caused by the vehicle's motion or changes in the outside temperature will cause the last setting to change. What is more, even if there was no setting change over a time period, the setting last selected by the installer at the installing location may be inappropriate when the vehicle is parked in a high traffic road or a multi-story parking facility and consequently may cause false alarms. When experiencing repeated false alarms, the owner will either turn off the alarm and thereby leave the vehicle vulnerable to thieves, or else will be inconvenienced by going back to the installing dealer for re-adjustment of the sensor. But even going back to the installing dealer provides no assurances whatsoever that the re-adjustment even if done properly at the dealer's location will be effective for all future parking locations, roads, traffic and weather conditions. Therefore, there is a need in the art for a security system that allows any owner, even the one with absolutely no technical interest or aptitude to adjust the sensor's sensitivity any place, anytime, without tools and without even knowing where the sensor is installed in the vehicle.

It is known that vehicle security systems may have one or more programmable features, and in fact many systems may have as many as thirty different programmable features, which the user is able to enable or disable. Frequently, while performing the programming of a specific feature, owners and installers become confused and inadvertently miss-program various functions which subsequently cause what appears to be a malfunction of the system. Yet there is no easy way for re-establishing the programmable features to a known condition. It would be useful to have a solution that enables the owner to return the programmable features to a known state with just a simple step.

Many vehicle security systems utilize audible alarm "chirping" and flashing of the vehicle parking lights to confirm remote arming and disarming. This chirping sound is particularly objectionable at night in a residential neighborhood. Consequently many owners disable the audible chirping, which leaves the flashing lights to provide a visual indication of the arming and disarming function. During daylight conditions, and particularly in high ambient light conditions, it can be difficult to see the light flashing, so that the owner may not be able to confirm the arming/disarming.

Many vehicles are equipped with automatic door locking and unlocking systems which lock the vehicle doors as soon as the driver turns the ignition key "on" and unlock the doors when the key is "off." In the event of a collision, the door can remain locked, delaying the driver and passengers from exiting the vehicle. This delay could be critical particularly in case of fire.

Another disadvantage of conventional vehicle security systems is that, when the owner leaves the vehicle unattended for over a week, the power consumed by the flashing LED, though seemingly minute (typically 5–15 ma), may over time cause the vehicle battery to be depleted to a low charge level that will prevent the owner from starting the engine. It would be clearly an advantage to provide a solution to the problem of long term battery loading due to the LED activation.

Presently, various manufacturers of vehicles have different door locking polarity, i.e. the signal polarity for locking and unlocking the doors may be either positive or negative, depending on the vehicle. When installing a vehicle security system that has door locking/unlocking outputs but no onboard relays, it may be difficult to the installer to match his security system door polarity to that of the vehicle. Consequently there is a need in the art for a security system with a programmable door locking and unlocking polarity.

In the conventional vehicle security system, a remote panic feature is provided. When the vehicle owner presses a panic button on the remote control transmitter, it activates the security system siren to call attention from passersby. It would represent an advance in the art to provide added personal security measures taken upon actuation of the remote control panic button.

SUMMARY OF THE INVENTION

A multifunction vehicle security system is described, which includes at least one receiver connected to a control unit which processes received information and enables various functions. The information may be transmitted via either a remote control transmitter, a pager, an electronically coded key, or a switch. The vehicle security system offers both user and installer programmable features which substantially improve over known system the performance, reliability, accuracy and ease of installation, and ease of user interface.

According to one aspect of the invention, improved user programmability of the system's sensor is provided. The owner or user can increase or decrease the sensor's sensitivity any place or any time without tools and without even knowing where in the vehicle the sensor is mounted. To adjust the sensitivity, the user merely presses a button on the remote control to increase the sensor sensitivity, and another button to decrease the sensitivity. Each time the sensitivity level is changed, the user receives an audible and/or visual acknowledgement. An alternate embodiment utilizes only one remote control button to both increase and decrease the sensitivity. By pressing the remote control button controlling the sensitivity, the sensitivity level will be stepped through the various sensitivity stages.

According to another aspect of the invention, a special programming mode is provided to reset the system programmable features and values to factory settings, i.e. to quickly re-establish to a known state for either all or only preselected features. For some applications, the resetting will delete all the stored remote control codes to which the system will respond as valid codes. For other applications, the one-step resetting will reset only user-programmable features other than the remote control codes.

A further feature of this invention is the automatic silencing during night conditions of the system's arming/disarming chirping to confirm the change of system state. In the preferred embodiment, a photodetector mounted in the vehicle provides a signal used to disable the chirping at night. This feature can be enabled or disabled by the owner at any time. While enabled, the owner receives the arming and disarming information visually via the flashing of the parking lights.

To provide an increased level of safety, the security system generates a door unlocking command to the vehicle's power door locking system to unlock the doors in the event of a vehicle collision. This can be particularly useful on vehicles which are equipped with automatic door locking when the driver starts the engine or when the vehicle is in motion. An impact sensor, air bag actuator, or monitoring of engine status can be used to sense the collision or its effects, and trigger the automatic door unlocking command.

A further feature is to provide a theft warning LED energy management system, to conserve battery power when the vehicle is left unattended for long periods of time. When the system is armed, a timer is started, and upon expiration of a time period, the LED activation duty cycle will be reduced from an initial duty cycle. If the security system still has not been disarmed after expiration of a further time period, the duty cycle will be reduced still further to reduce the power consumption even more.

To aid in installation of the security system, the polarity of the door locking and unlocking signals is programmable. This enables the installer to match the polarity requirements of a particular vehicle.

An enhanced panic mode is also provided. Rather than responding to a panic mode command by simply sounding the alarm siren, the security system will also automatically unlock the vehicle doors if the vehicle ignition switch is off, to facilitate the owner's entry into the vehicle. If on the other hand, the vehicle ignition switch is on, the doors will be automatically locked, to prevent unwanted entry into the vehicle while the owner is inside.

Yet another aspect of this invention is the installer programmability of the normally open/closed mode for the vehicle starter, ignition, and/or fuel pump disable relays.

BRIEF DESCRIPTION OF THE DRAWING

These and other features and advantages of the present invention will become more apparent from the following detailed description of an exemplary embodiment thereof, as illustrated in the accompanying drawings, in which:

FIG. 10 illustrates an illustrative driver module which can be called from the main loop (FIG. 3) at the appropriate time to confirm the system arming/disarming, showing disabling of the siren chirping during night time.

FIG. 12 is a flow diagram illustrating an exemplary embodiment of an LED power consumption management feature of the invention.

DETAILED DESCRIPTION OF THE PREFERRED EMBODIMENT

Figure 1:
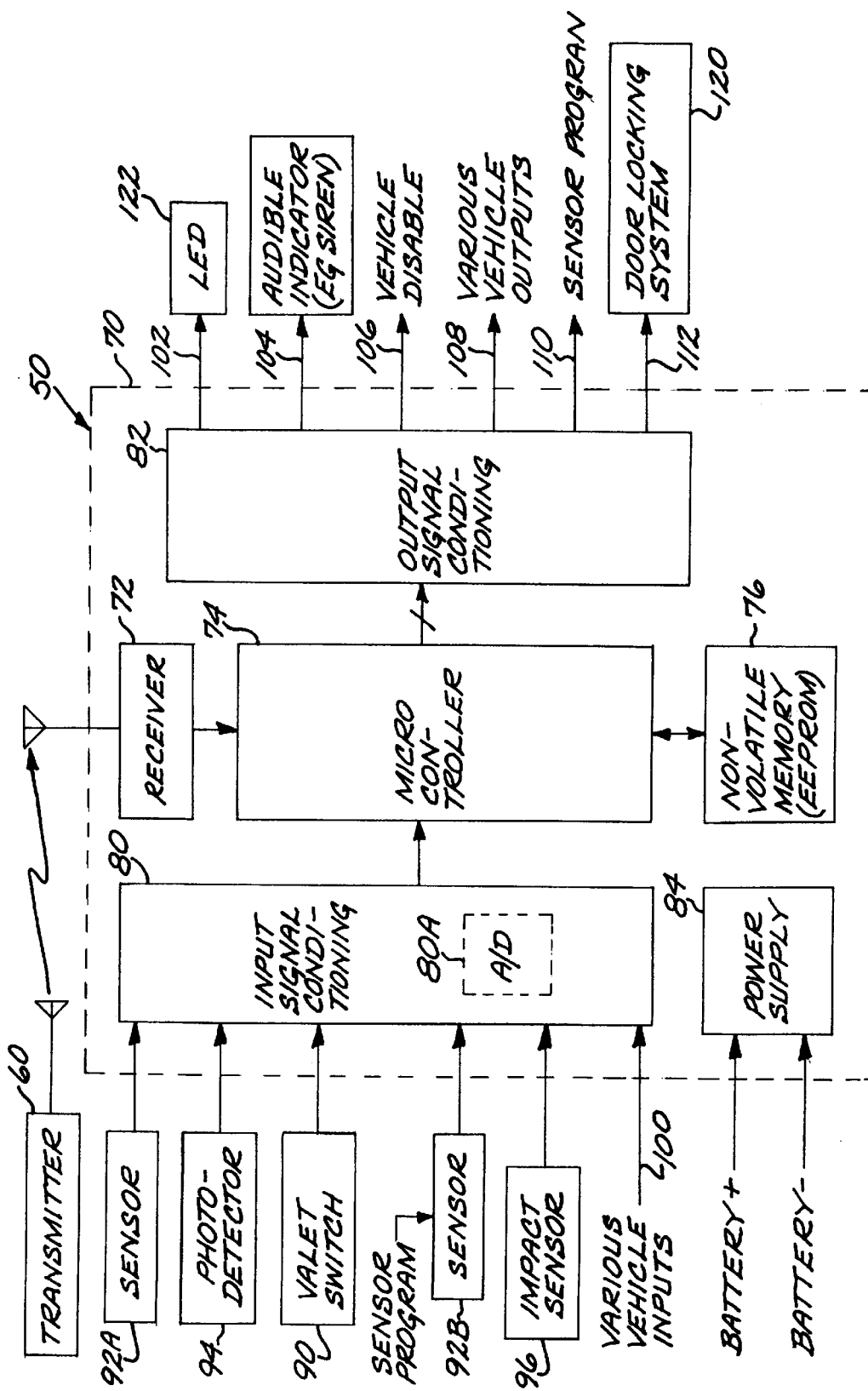
FIG. 1 is a schematic block diagram of an electronic vehicle security system.

FIG. 1 is a simplified block diagram of a vehicle security system 50 embodying this invention. The system includes a hand-held remote control transmitter 60, and vehicle-installed components generally indicated as 70. Vehicle security systems with which the present invention may be used are described, for example, in commonly assigned U.S. Pat. Nos. 4,887,064, 4,922,224, 5,146,215 and 5,467,070, the entire contents of which are incorporated herein by this reference. For clarity, many of the well-known components of the security system are not described in detail herein.

Figure 2:
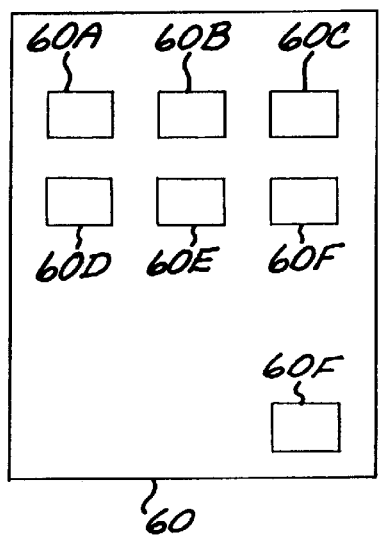
FIG. 2 is a simplified representation of a remote transmitter.

Preferably, the transmitter 60 is a multi-channel transmitter, capable of generating encoded commands for activating various functions. One channel is dedicated to arming/disarming the security system, such that a first activation of the arm/disarm button, e.g. button 60A (FIG. 2), causes a first coded signal to be transmitted, which toggles the arm/disarm status of the system; e.g. a first receipt of the first coded signal arms the system, and a second receipt of the first coded signal disarms the system. Alternatively, two channels may be used for the arm/disarm function, with one coded signal actuated through an arm button on the transmitter arming the system, and a second coded signal actuated through a disarm button on the transmitter disarming the system. The transmitter also includes a panic button, e.g. button 60D (FIG. 2) which causes a panic coded signal to put the security system in a "panic" mode.

A multi-channel transmitter suitable for the purpose of transmitter 60 is described in commonly assigned U.S. Pat. No. 4,890,108, the entire contents of which are incorporated herein by this reference.

The components 70 installed in the vehicle include a receiver 72, which responds to commands received from the transmitter 60, a microcontroller 74 and a nonvolatile memory 76. Input signal conditioning circuitry 80 conditions signals received from a valet switch 90, from exemplary sensors 92A and 92B, impact sensor 96, and from the other typical vehicle inputs 100 commonly employed by electronic security systems, e.g. the ignition switch, door triggers, and the like, to be compatible with the inputs to the microcontroller 74. The inputs 100 can also include signals indicating the position of the transmission gear selector, and tachometer signals indicating whether the vehicle engine is running. The circuitry 80 includes an analog-to-digital conversion function 80A to convert analog signals into digital signals. Output signal conditioning circuitry 82 conditions control signals output by the microcontroller 74 to drive various output devices by the several output lines, e.g. line 102 to drive LEDs to provide visual indication signals, line 104 to drive an audible indication device such as a siren, line 106 to control a vehicle disabling means, such as an ignition system disable, fuel pump disable or starter disable relay, and line 108 to control various types of vehicle devices, e.g. hood lock, door locks and the like. Another signal 110 is the sensor program control signal, used to control the sensitivity of the sensor 92.

A power supply 84 is connected to the vehicle battery to supply power to the various components 70.

A photodetector 94 is mounted within the vehicle, e.g. on the dashboard, and provides a photodetector signal to the microcontroller 74 through the signal conditioning circuitry 80, which uses the signal for disabling the arming/disarming chirps during nighttime operation, as described more fully below.

Figure 3:
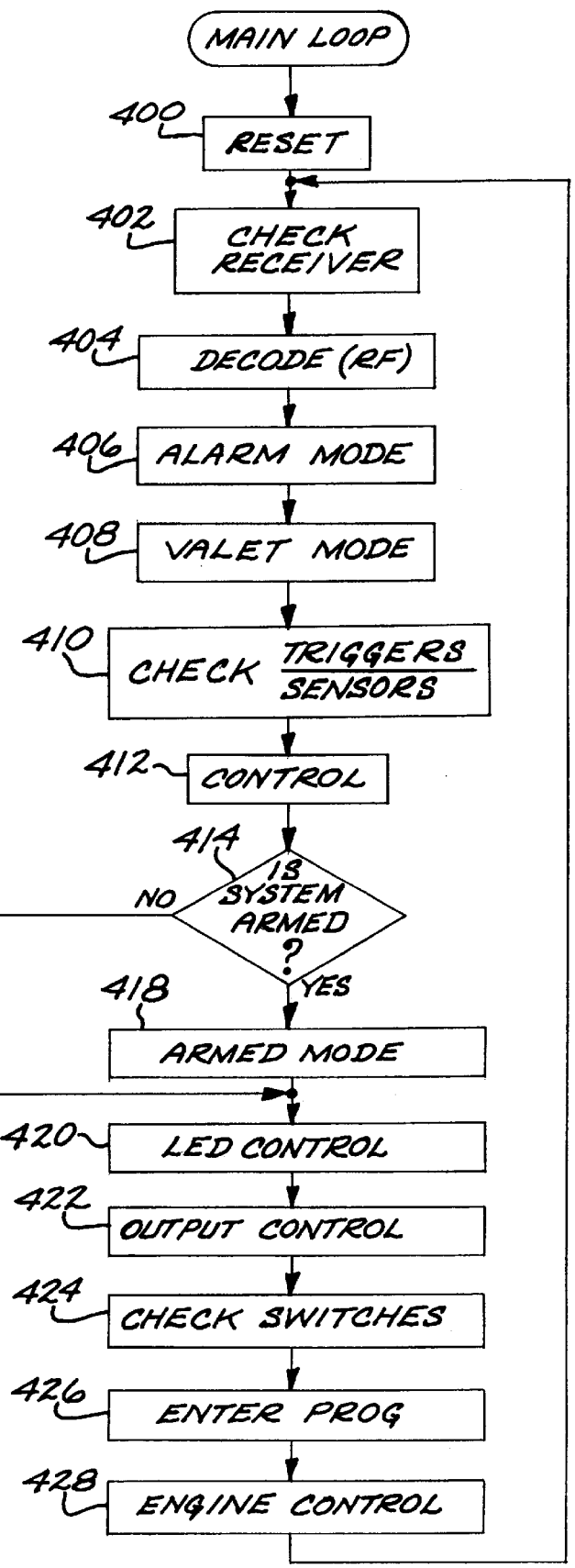
FIG. 3 is a general flow diagram of the operation of the security system.

A general flow diagram of the operation of the security system is shown in FIG. 3. As will be apparent to those skilled in the art, in this exemplary embodiment, the desired operation of the system is achieved by appropriate programming of the microcontroller 74 to execute instructions achieving the general functions indicated in the flow diagram. See, for example, commonly assigned U.S. Pat. No. 4,887,064, at FIG. 11 et seq., the entire contents of which are incorporated herein by this reference. The operation starts at step 400 on system powerup with the reset function, resulting in a reset circuit providing a reset signal to the microcontroller 74 to initialize the various parameters and flags utilized by the microcontroller. The next function is the "check receiver" function 402, in the case in which an external decoder is employed to determine whether a received message matches the predetermined code sequence. If decoding internal to the microcontroller 74 is employed instead of an external decoder, this function is performed at step 404. This function is a correlation of the received sequence of digital data bits with a stored authorization code. If the received signal matches the stored code, then a flag is set indicative of the condition of a correctly entered user authorization code. The decode function is typically interrupt driven, with assembly of the incoming data bits occurring in the background until a "dead period" is detected with no data coming in for a predetermined period of time. Then the received bit sequence is compared with the stored data, and flags are set accordingly.

The next function performed in the operation flow indicated in FIG. 3 is the alarm mode function 406. Here, the alarm mode is commenced, if appropriate, as determined by the appropriate software flags. Thus, if the alarm mode has been triggered, then controlled devices such as the siren, the dome and parking lights and the like as programmed to occur during an alarm event are activated. The alarm mode starts a timer for the alarm duration.

The next function in the overall sequence is the "valet mode" function 408. The valet mode allows the security system to be disabled so that the vehicle may be left in the care of an authorized person, such as a valet, service technician, or the like. The valet mode is preferably a secure valet mode, requiring entry of a coded signal, as more particularly described in commonly assigned U.S. Pat. No. 5,467,070, the entire contents of which are incorporated herein by this reference. This mode is entered via entry of a valet code, either through the remote control transmitter or through the valet switch.

The next function 410 to be performed is to check the triggers and sensors of the system. The microcontroller reads the states of the various signals input through the signal conditioning circuitry 80, to look for active signals and determine signal levels in some instances, and compare the signal levels to thresholds. It is during this function that tripped sensors and triggers are recognized by the microcontroller 74.

The next function in the exemplary main loop (FIG. 3) is the control function, which in general responds to the decoding outputs from signals received from the transmitter. When the command is received to arm the system, the microcontroller 74 enables two siren's chirp sounds to indicate the change in system status, generated by pulses applied to the siren 104, and sets an ARMED flag. If the command is received to disarm the system, then a single siren's chirp sound is enabled, and the system is disarmed.

Once the control function is completed, then at step 414 a decision is made as to whether the system is armed, by checking the ARMED flag. If the system is armed, then the next function is the armed mode 418. If the system is not armed, the next function is the disarmed mode 416, which controls passive arming functions.

An LED control function 420 controls the flashing of LED devices 122. When the system is armed, a red LED is periodically flashed to warn intruders that the vehicle is protected by a security system.

The output control function 422 examines output flags set by the microcontroller 74 for the various controlled output device lines 102–108 and 112. If the particular flag is set, the output line will be activated. If the flag for a particular output line is cleared, the microcontroller will deactivate that device. Thus, this function activates and deactivates the controlled devices in dependence on the state of the software flag associated with a particular device.

The next function is the check switches function 424, during which the microcontroller checks the status of all switches, other than sensors and triggers, i.e. the ignition switch, the valet switch 90, and sets flags as appropriate for each switch.

The enter program function 426 is to program information into the system, e.g. to set various programmable functions, as described more particularly in U.S. Pat. No. 4,887,064.

The engine control function 428 selectively disables the vehicle engine to prevent unauthorized operation of the vehicle. After this step has been performed, the operation flow loops back to step 402 the commence the loop again. The entire main loop takes only a short period of time to complete, on the order of milliseconds.

The operational flow of FIG. 3 is merely exemplary, and applications embodying this invention will omit or reorder various functions shown therein. U.S. Pat. No. 4,887,064 describes various functions in further detail.

Remote Sensor Programming

In accordance with one aspect of the invention, the sensitivity of the sensors 92A and 92B can be remotely adjusted through use of the remote control transmitter 60. To adjust the sensitivity, the user presses a button, e.g. button 60B on the transmitter, to send a signal to increase the sensor's sensitivity, or another button, e.g. button 60C, to send a signal to decrease the sensitivity. Each time the sensitivity level is changed, the system provides an audible and/or visual acknowledgement to the user, e.g. through siren chirps. Upon receipt of the remotely transmitted sensitivity adjustment commands, the microcontroller 74 changes a stored threshold value which determines the magnitude of the sensor signal required for the microcontroller to determine that the sensor has been tripped. In an alternate embodiment, wherein the sensor device itself includes a programmable circuit, the microcontroller issues an appropriate sensor program signal through the output signal conditioning to cause the sensitivity of the sensor 92A to be adjusted appropriately.

Figure 4:
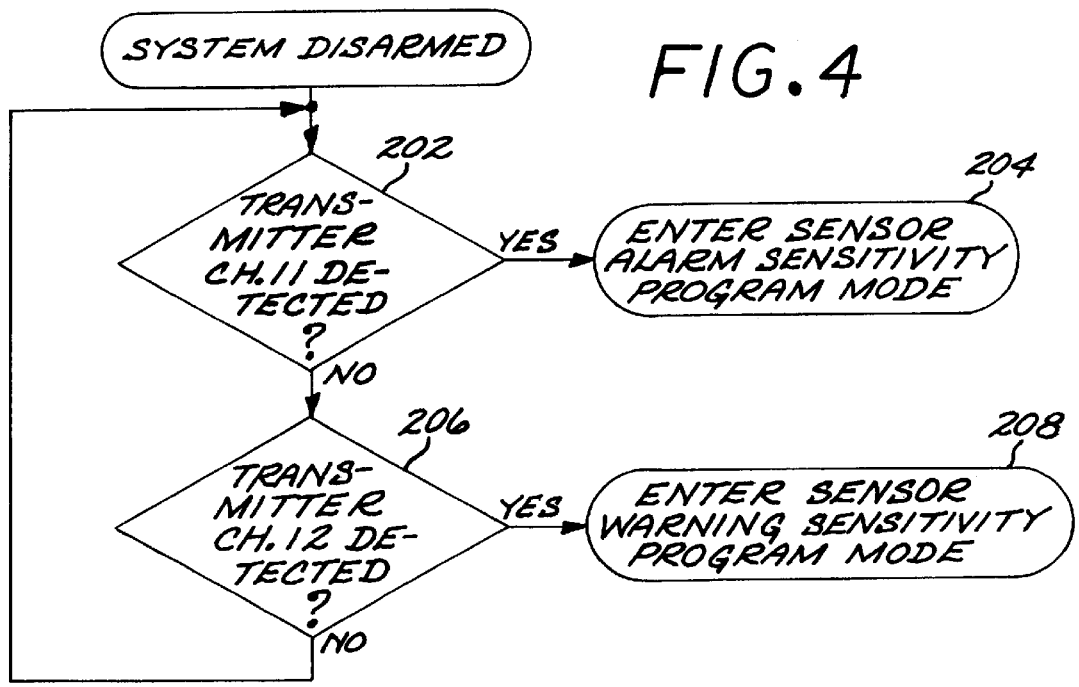
FIG. 4 illustrates a flow diagram of an exemplary programming technique for using the transmitter to adjust the sensitivity of a sensor in accordance with the invention.

FIG. 4 illustrates an exemplary flow diagram of an exemplary programming technique for using the transmitter 60 to adjust the sensitivity of the sensor 92A. This technique is for use with a sensor generating analog output signals in response to a disturbance event, such that the larger the magnitude of the signal, the more significant the disturbance event. The analog sensor signal is converted to digital format by the signal conditioning circuitry 80. The controller 74 reads the digital sensor value, and compares the digital sensor value to two stored threshold values, the first setting a warning sensitivity and the second an alarm sensitivity. The warning sensitivity threshold is a lower threshold than the alarm sensitivity threshold, and so the system can generate a warning signal to warn a person in close proximity to the vehicle to move away, for example, without declaring an alarm condition. When the sensor signal level exceeds the alarm sensitivity threshold value, the sensor is declared to be "tripped" and an alarm condition is generated.

The sensitivity of the sensor 92A is adjusted by use of the remote transmitter 60 in accordance with the procedure of FIG. 4. This procedure is only available if the system is in the disarmed state. During the disarmed state, the system controller is responsive to particular coded signals from the transmitter to enter either the sensor alarm sensitivity program mode or the sensor warning sensitivity program mode. This exemplary embodiment is for use with a multi-channel transmitter as described in U.S. Pat. No. 4,890,108. As described therein, the transmitter can be set to transmit a particular coded signal for different channels. Assume that the transmitter channel 11 is assigned as the channel to command the system to the alarm sensitivity program mode, and that the transmitter channel 12 is assigned as the channel to command the system to the warning sensitivity program mode. Among other functions performed during the system disarmed state are functions 202 and 206 (FIG. 4), which indicate whether a channel 11 or a channel 12 transmission has been received at the system controller. Upon detection (step 202) of a channel 11 transmission, which is a particular coded signal which the controller 74 recognizes as a transmission for channel 11, the sensor alarm sensitivity program mode is entered (step 204), shown more fully in FIG. 5. Upon detection (step 206) of a channel 12 transmission, which is a particular coded signal which the controller recognizes as a transmission for channel 11, the sensor warning sensitivity program mode is entered (step 208), shown more fully in FIG. 6. If neither channel transmission is detected during this loop through the flow process of FIG. 4, the operation loops back to step 202, after performing other known processing steps for the disarmed state.

Figure 5:
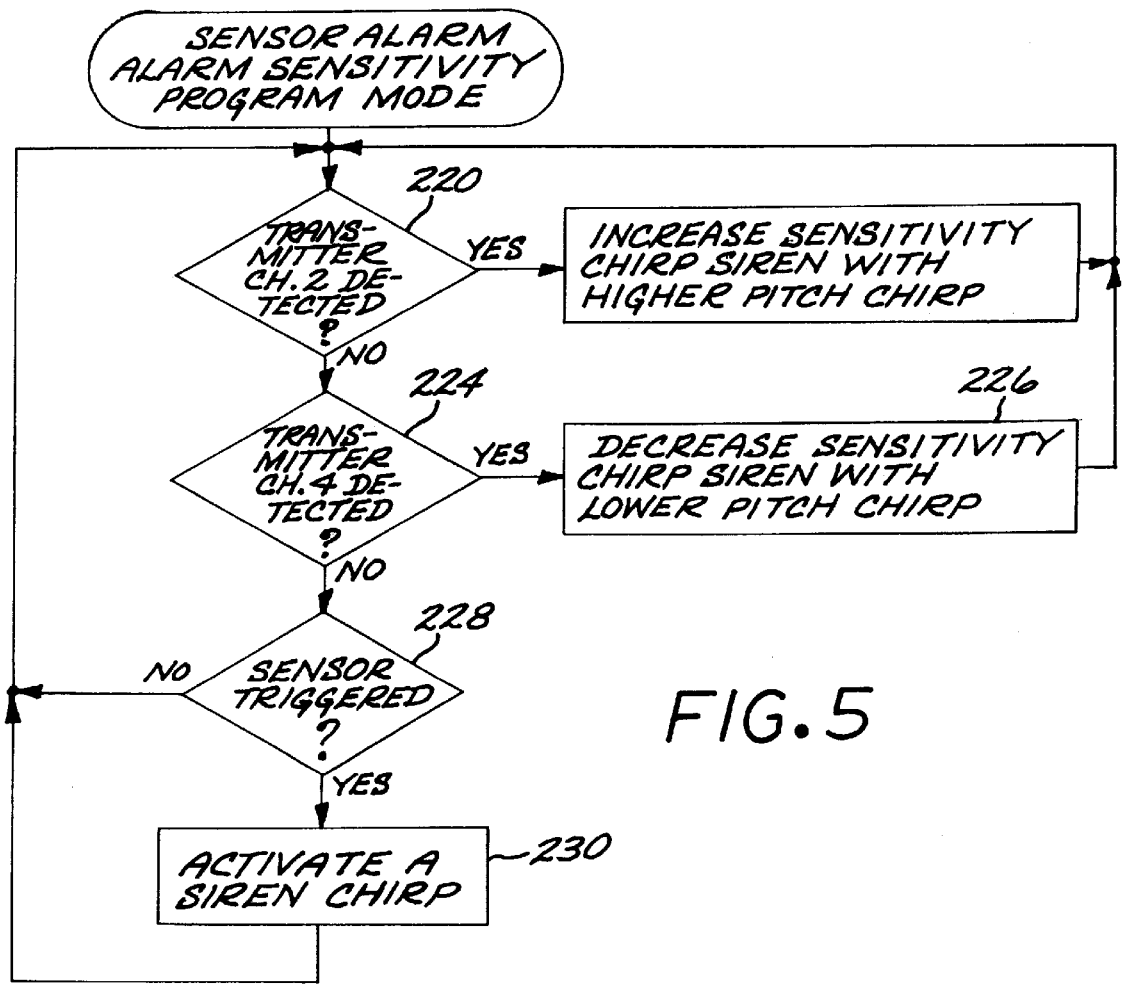
FIG. 5 is a flow diagram of an exemplary sensor alarm sensitivity program mode.

Referring now to FIG. 5, once the alarm sensitivity program mode has been entered, the controller watches for transmissions from transmitter channels preassigned to this programming function. In this exemplary embodiment, transmitter channel 2 is assigned the function of increasing the sensitivity, and channel 4 is assigned the function of decreasing the sensitivity. At step 220, if a channel 2 transmission code is detected, the sensor sensitivity is increased by incrementally decreasing the alarm threshold value stored in memory. The increase in sensitivity is signalled by chirping the siren with a higher pitch chirp than is used for such functions as signalling that the system has been armed or disarmed. Operation then loops back to step 220 to begin the loop again. If instead the user wishes to decrease the sensor alarm sensitivity, the user actuates the transmitter channel 4, which is recognized by the controller 74 to decrease the sensitivity by incrementally increasing the alarm threshold value stored in memory. At step 228, a comparison is made between the current sensor signal value and the updated alarm threshold value to determine whether the sensor is triggered by sensor signal value. This permits the user to test the sensor for the new threshold value. For example, say the sensor is an ultrasonic motion detector. By approaching the vehicle the user can test the sensor sensitivity while in the alarm sensitivity program mode. If the sensor is triggered, a siren chirp is activated (step 230), and operation returns to step 220. If further adjustment of the sensitivity is desired, the user can actuate either channel 2 or channel 4 on the transmitter 60 to incrementally increase or decrease the sensitivity once again. This program mode will be automatically exited upon expiration of a predetermined time interval during which no channel 2 or channel 4 transmission is detected.

Figure 6:
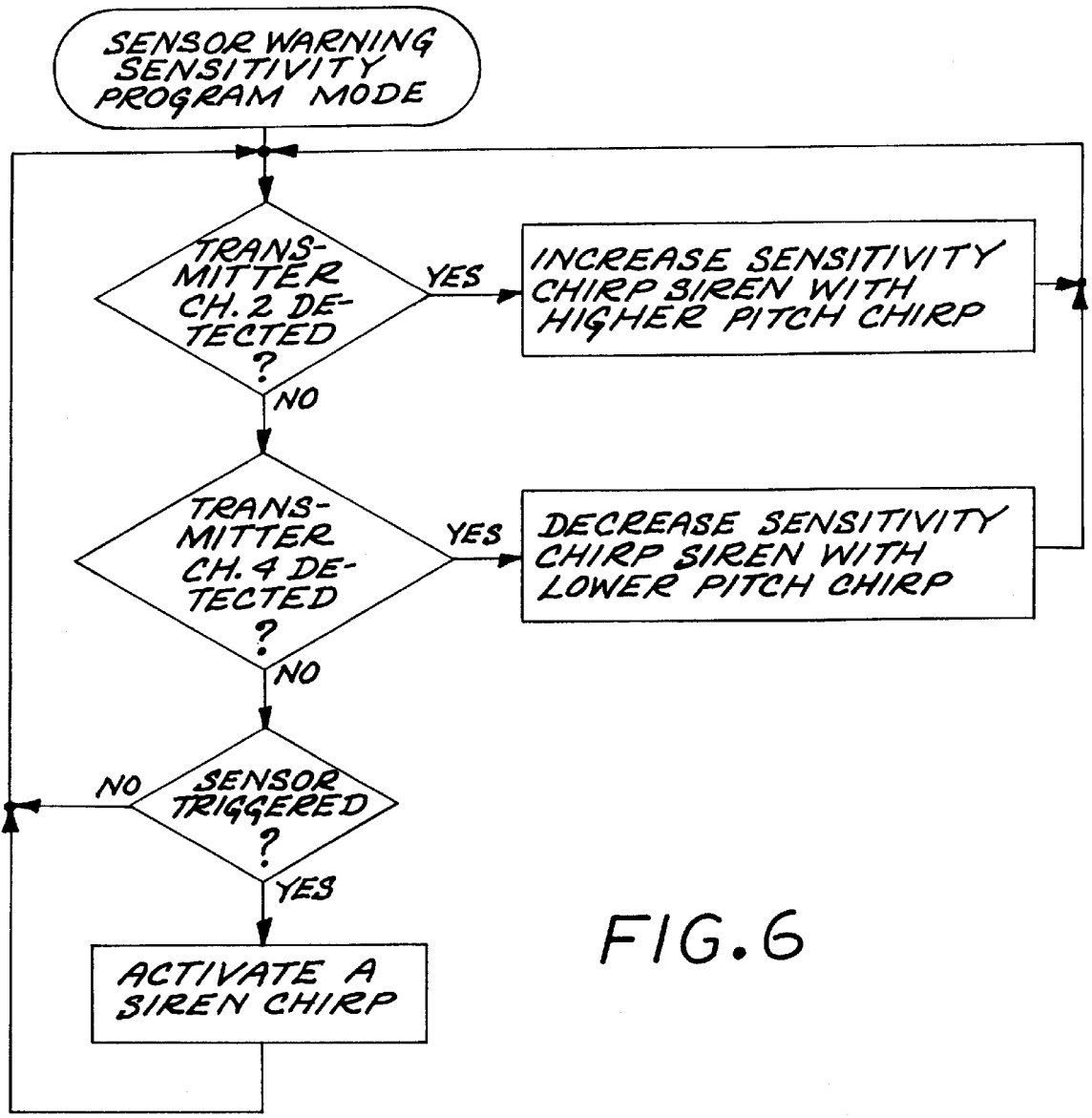
FIG. 6 is a flow diagram of an exemplary sensor warning sensitivity program mode.

FIG. 6 illustrates the sensor warning sensitivity program mode, which is identical to the alarm sensitivity program mode except that the warning threshold value stored in memory is decremented or incremented to increase or decrease the sensitivity.

In an alternative embodiment, the sensor can include a program circuit which responds to a sensor program signal issued by the controller 74 to adjust the sensitivity of the sensor. Sensor 92B illustrates this sensor programming embodiment.

Figure 7:
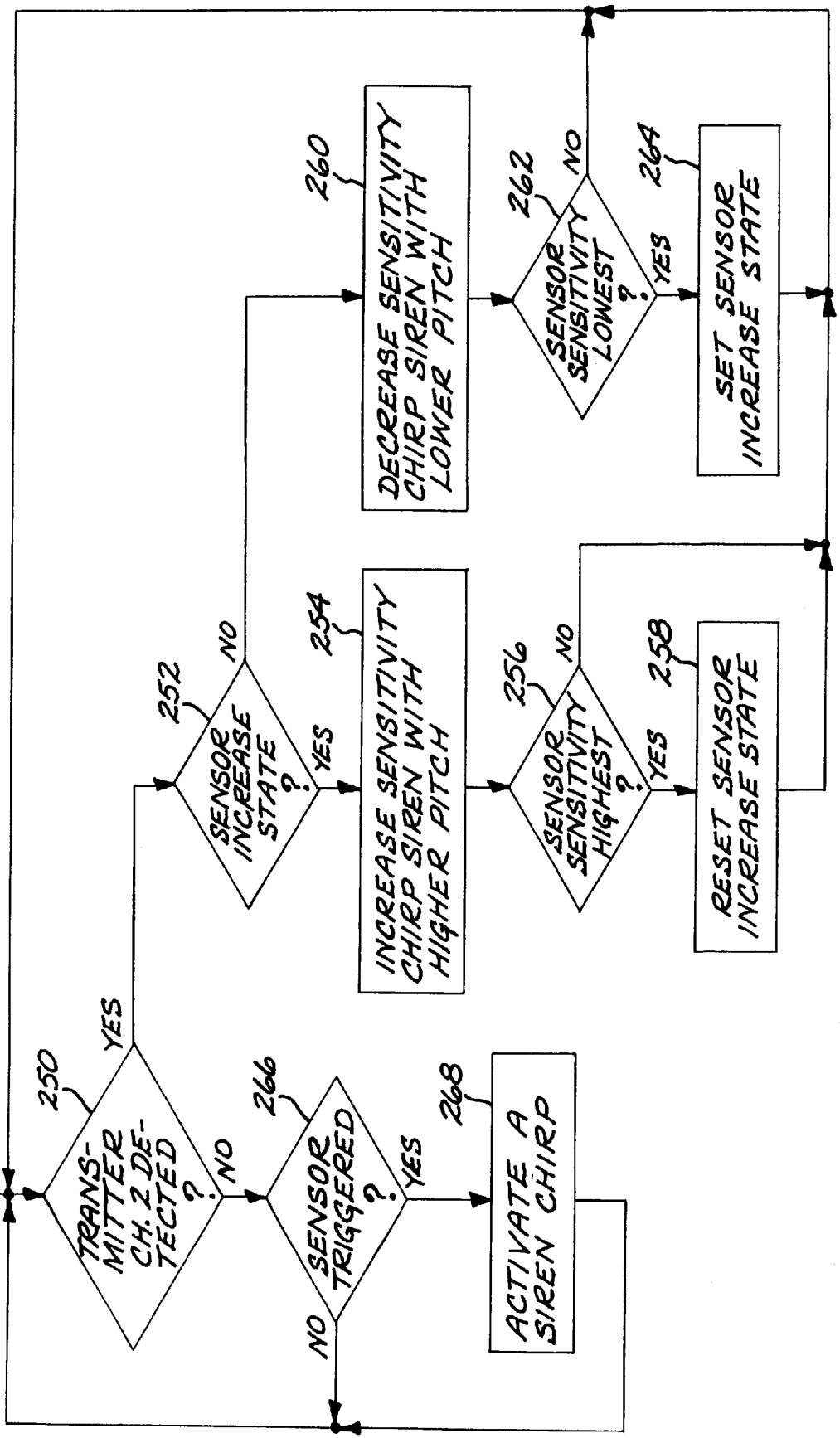
FIG. 7 is a flow diagram of an alternate sensor alarm sensitivity program mode.

In a further alternate sensor programming arrangement, a single remote control button or channel can be used to both increase and decrease the sensitivity of the sensor. By pressing the remote control button controlling the sensitivity of the sensor, the sensor adjustment circuit will be stepped through the various sensitivity stages in a similar fashion to the way in which the hands of a clock cycle through the 12 hour cycle. FIG. 7 is an exemplary flow diagram illustrating this alternate programming technique, particularly an alternate sensor alarm sensitivity program mode, which is entered at step 204 (FIG. 4) instead of the program mode of FIG. 5. Only the channel 2 switch of the transmitter controls the sensitivity programming, in this exemplary embodiment. If the channel 2 code is recognized by the controller at step 250, the procedure branches to step 252. If the system is in the sensor sensitivity increase state, then the sensitivity is increased (step 254) by decreasing incrementally the stored alarm threshold value. The increase in sensitivity is confirmed by generation of a siren chirp with a higher pitch. Step 256 determines whether the sensor sensitivity has been set to its highest available sensitivity. If not, operation returns to step 250. If yes, the sensor increase state is reset to an off state (step 258) before operation returns to step 250. At step 252, if the sensor increase state is not set, then the sensor sensitivity will be decreased at step 260 by incrementing the stored alarm threshold value, confirmed by a siren chirp of lower pitch. At step 262, if the sensor sensitivity is at its lowest available sensitivity, operation proceeds to step 264 to set the sensor increase state before returning to step 250. Steps 266 and 268 are identical to steps 228 and 230 (FIG. 5). This programming mode will also be exited after a predetermined time period in which no channel 2 transmissions are received.

One Step Re-Set of Programmable System Procedures.

Another aspect of this invention is the capability which permits the user or installer to quickly re-establish all the programmable features of the system to a known state. Some vehicle security systems in use today have many programmable features; one such system is described in commonly assigned U.S. Pat. No. 4,922,224. By using a simple procedure in accordance with the invention, the user is able to reset all the programmable features to the factory pre-set state which can be well documented in both the owner's and installation manuals. An advantage of this feature is that it permits the owner to delete all the stored codes of all remote controls in one step rather than the time consuming process of deleting each code individually. This is particularly advantageous when there is a need for storing large numbers of remote control codes or electronic key codes by fleet owners who require, for example, that each of many locations will have an emergency key for all vehicles. In a further embodiment of this aspect of the invention, the user or installer is able to quickly reset all the programmable features except specifically identified features, such as the stored codes of the remote controls or the installer programmable features.

Figure 8:
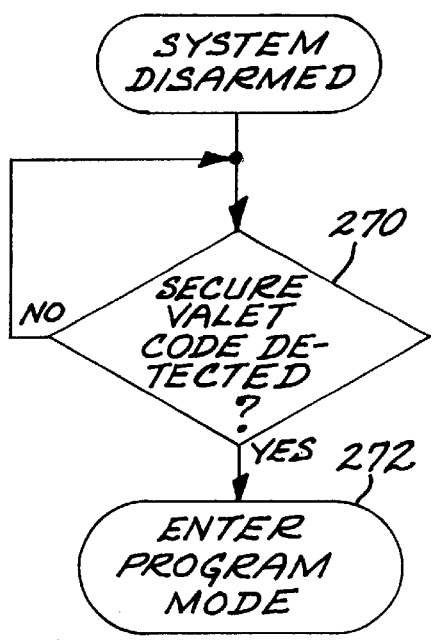
FIG. 8 is a flow diagram illustrative of entry into the programming mode to reset the system to factory settings.
Figure 9:
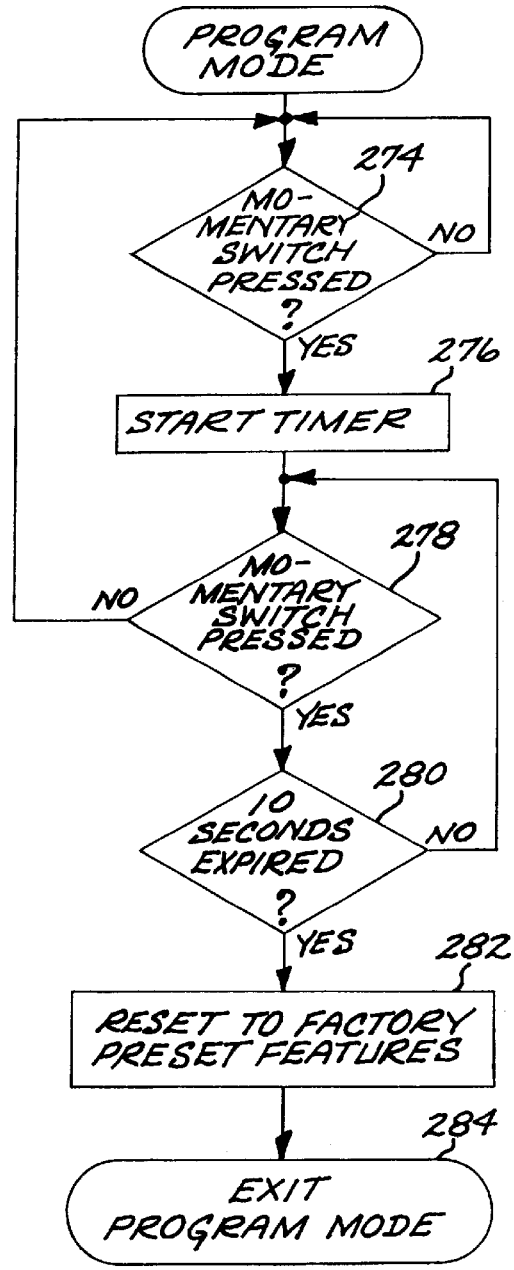
FIG. 9 illustrates the program mode to reset the system to factory settings.

FIGS. 8 and 9 illustrate this aspect of the invention. This programming mode is entered after the system has been put into a secure valet mode. This secure valet mode is described in U.S. Pat. No. 5,467,070, the entire contents of which are incorporated herein by this reference. To enter the valet mode requires that the user first enter a valid personal access code via the valet switch or remote transmitter. Once the secure valet code is detected (step 270) while the system is disarmed, the programming mode to reset the system to factory settings is entered at step 272. FIG. 9 illustrates this program mode. To select this programming mode (e.g. from other programming modes available to the user), the user actuates the valet switch 90 in a particular manner. Preferably, the valet switch is a single pole, double throw switch having a center position-open, a latched side-closed, and a momentary side-closed, with a spring to bias the center conductor to return to the center position from the momentary position. When the center conductor is moved into contact with the latch side, the center conductor is latched to that position until the user moves the center conductor back to the center position. This configuration is selected since the switch's momentary side lends itself for rapid entry of repeated actuation. At step 274, if the valet switch is held to the momentary side, a timer is started (step 276), and the switch state is checked (step 278) until ten seconds has expired with the valet switch held to the momentary side. This is taken as a programming command to reset the system programmable features to factory preset states or values (step 282). The program mode is then exited (step 282).

The user still has available the programming options previously available to him, exemplary ones of which are described in U.S. Pat. Nos. 4,922,224 and 4,887,064. With this new programming feature, the user can quickly re-establish the system to the factory preset values without laboriously accessing each feature in the programming mode. The particular features and values which can be preset to factory settings can be determined by the factory. For some applications, it will be desirable not to preset some features to factory settings. For example, some customers may desire the ability to use this programming capability to delete all valid remote control codes from memory. In this case the reset procedure of FIG. 9 can be set to also zero out or delete from memory all previously stored remote control codes which can be used to control the system. Other customers may desire that the remote control codes not be deleted when using this feature to set other programmable features to factory settings. In this case, the system can be programmed with a feature list which contains the features which are to be reset to factory settings upon use of the procedure of FIG. 9, and the remote control codes will not appear on this list.

Nocturnal Silencing of Confirming Chirps.

A further aspect of the invention is a new programmable feature, the automatic silencing of the system's audible chirping confirming arming and disarming during the night, and resumption of the chirping during daylight. The chirping sounds can be objectionable at night in a residential neighborhood. While it is known to provide the capability to disable the chirping, there is as a result no audible signal to the user that the system has been armed or disarmed via actuation of the transmitter. As a result, in strong sunlight for example, the user may be unable to see whether the parking lights have flashed to indicate arming or disarming. The invention automatically disables the chirping only during night conditions, maintaining the advantage of the audible chirping during daylight conditions.

The system utilizes the photodetector signal from the photodetector 94 to signal to the controller 74 that the vehicle is located in a dark location. During the daylight conditions, the detector 94 generates a current which can be sensed by the input signal conditioning circuitry 80, and is used by the microcontroller 74 as an indication that the confirming chirping is to be provided upon arming or disarming the system using the remote control. When the current drops below a threshold current level, this indicates to the controller 74 that the confirming chirping should be disabled. Thus, during night conditions, arming or disarming the security system by use of the remote transmitter results in confirming parking light flashing, but no siren chirping. The automatic disabling of the confirming chirping at night can be enabled or disabled by the owner during a programming mode. When the feature is enabled, the owner receives the arming and disarming information visually at night via the flashing of the parking lights.

FIG. 10 illustrates the operation of this feature, by showing an illustrative driver module 300 which can be called from the main loop (FIG. 3) at the appropriate time to confirm the system arming/disarming. In this exemplary embodiment, the output of the photodetector 94 can be used by the controller 74 to reach a decision (step 302) as to whether the confirming siren chirps should be disabled. For example, the analog photodetector output can be digitized, and compared by the controller to a preset threshold to determine whether the vehicle is in a dark environment, i.e. nighttime. Alternatively, the controller 74 could keep a 24 hour clock, and simply determine that it is nighttime by reference to the time, with pre-established parameters on the time period during which the siren confirming chirps will be disabled, say 9:00 pm to 6:00 am. If it is not night, then the siren chirp(s) are generated to confirm the arming/disarming of the system (step 304). Typically arming is confirmed by a single chirp, and disarming is confirmed by two chirps. If it is night, step 304 is bypassed, thus disabling the chirping. At step 306, the parking lights are flashed the appropriate number of times, again typically once for arming, twice for disarming, and the operation returns 310.

Impact-Activated Automatic Door Unlocking.

Another objective of the invention is to provide a higher level of safety for the vehicle owner. In the case of a serious traffic accident, the vehicle doors will automatically unlock immediately following an impact. Many vehicles today are equipped with automatic door locking and unlocking systems, such as system 120 (FIG. 1), which lock the doors as soon as the driver turns the ignition key "on" and unlocks the doors when the ignition key is turned "off." In accordance with the invention, the microcontroller 74 acts in response to an impact signal from an impact sensor 96, to generate a door unlock command signal to the door locking system 120 to unlock the vehicle doors. The impact sensor 94 may, in some applications, be the same sensor used to deploy the air bags, an accelerometer, or no sensor at all except the existence of certain conditions, such as ignition switch "on," gear in forward drive, while the engine remains stalled for longer than a predetermined time.

Figure 11:
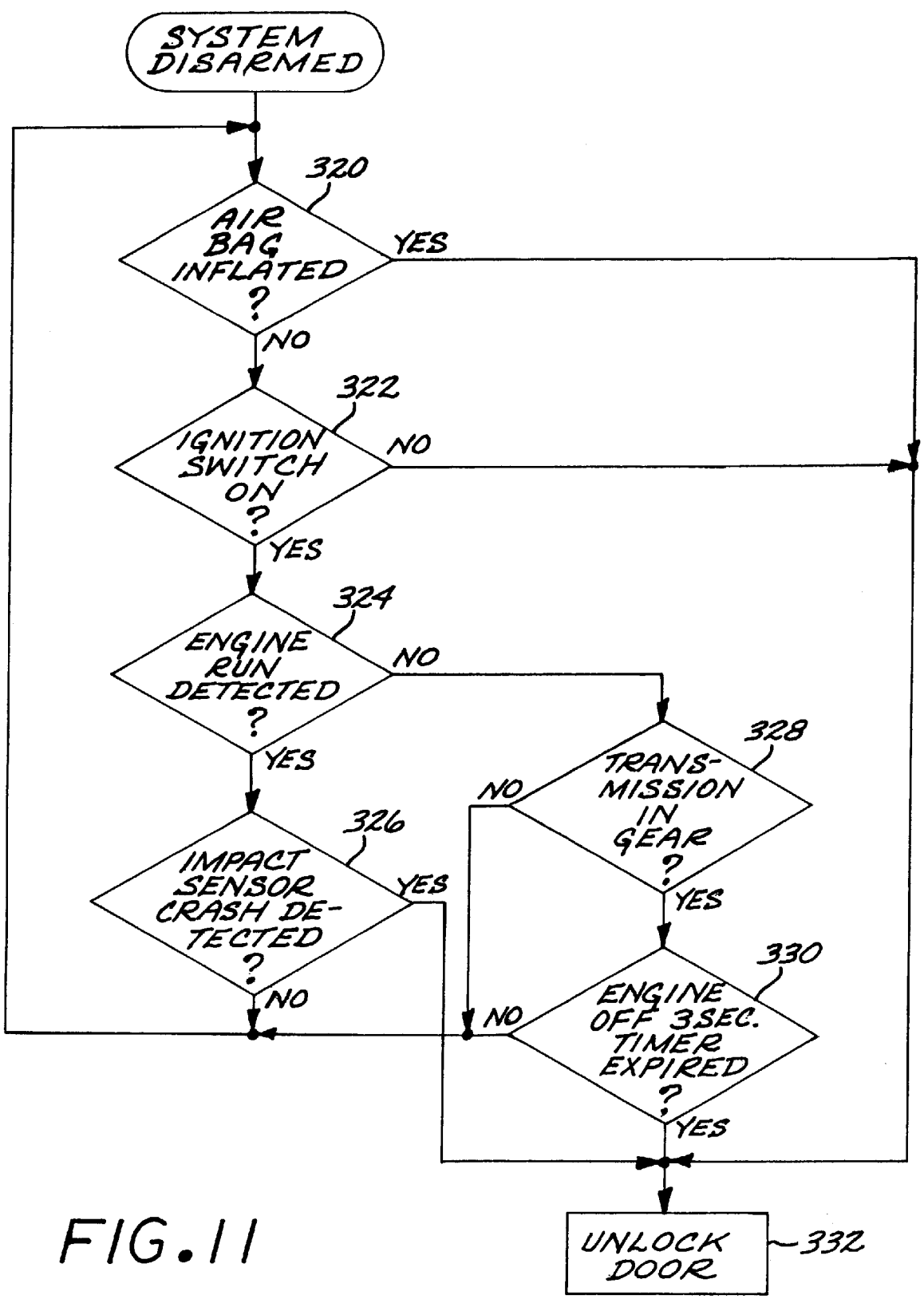
FIG. 11 is a flow diagram illustrating an exemplary embodiment of automatic unlocking of the doors following a collision.

FIG. 11 is a flow diagram illustrating an exemplary embodiment of this aspect of the invention. The automatic unlocking of the doors will occur only when the system is disarmed; the system is unarmed while the vehicle is being driven. The controller will respond to input signals indicating that the vehicle air bag has inflated (step 320), that the ignition switch is not on (step 322), that the engine is not running (step 324), and that a vehicle collision or crash has been detected by the impact sensor 96. If the air bag inflates, the controller 74 sends a signal to the door locking system 120 to unlock the doors. If the vehicle does not have an air bag or other impact sensor device, and the transmission is in gear while the engine has been "off" or stalled for a predetermined time interval (3 seconds in step 330), the doors are unlocked. Until the 3 second timer expires, operation will loop back to step 320. Steps 324, 328 and 330 will typically be omitted for installations in vehicles equipped with an air bag or an collision sensor such as an accelerometer.

Automatic Reduction of LED Flashing Rate.

This aspect of the invention is designed to save battery power when the owner leaves the vehicle unattended for a protracted period of time. If the security system is equipped with a theft warning LED such as LED 122 (FIG. 1), which is flashed continuously on and off to warn a thief that the vehicle security system is armed, the cumulative power consumed over time can cause the battery to be depleted to a level that the engine cannot be started. In accordance with the invention, the system has a battery saving mode. A timer function of the microcontroller 74 is activated when the system is armed. After a certain number of hours have been counted without the system being disarmed, the LED flashing rate is decreased. After an additional number of hours has elapsed without the system being disarmed, the LED flashing rate is again substantially reduced. This battery saving mode conserves the battery power while still maintaining the visual alert.

FIG. 12 is a flow diagram illustrating an exemplary embodiment of this aspect of the invention. At step 340, the system is armed, the LED 122 flash rate is set to 50% duty cycle, and a timer is started. With a 50% duty cycle, the LED will be energized 50% of the time as an indication or warning that the vehicle security system is armed. The timer is periodically checked (step 342) while maintaining the same LED duty cycle until a first predetermined time interval has passed, in this example 48 hours, since the system was armed. At this point, the controller 74 reduces the LED duty cycle to 25%, to conserve battery power. Again the timer is periodically checked (step 346) until a second predetermined time interval has passed, in this example 96 hours, since the system was armed. At this point the LED duty cycle is further reduced to 12.5%, to further conserve battery power. In this exemplary embodiment, the LED duty cycle remains at 12.5% until the system is disarmed, although in other applications, the LED duty cycle can be further reduced upon the passage of additional time since arming, at the option of the system designer.

Programmability of Door Locking Control Signal Polarity.

Depending on the vehicle manufacturer, the door locking system may require a door locking signal of positive or negative (ground) polarity in order to actuate the door lock or unlock function. In accordance with the invention, the polarity of the door locking control signal 112 (FIG. 1) provided by the security system controller 74 can be set or programmed by the installer to match the polarity required by the vehicle. This feature saves the cost of additional labor and relays when the vehicle's door polarity does not match that of the security system.

Figure 13:
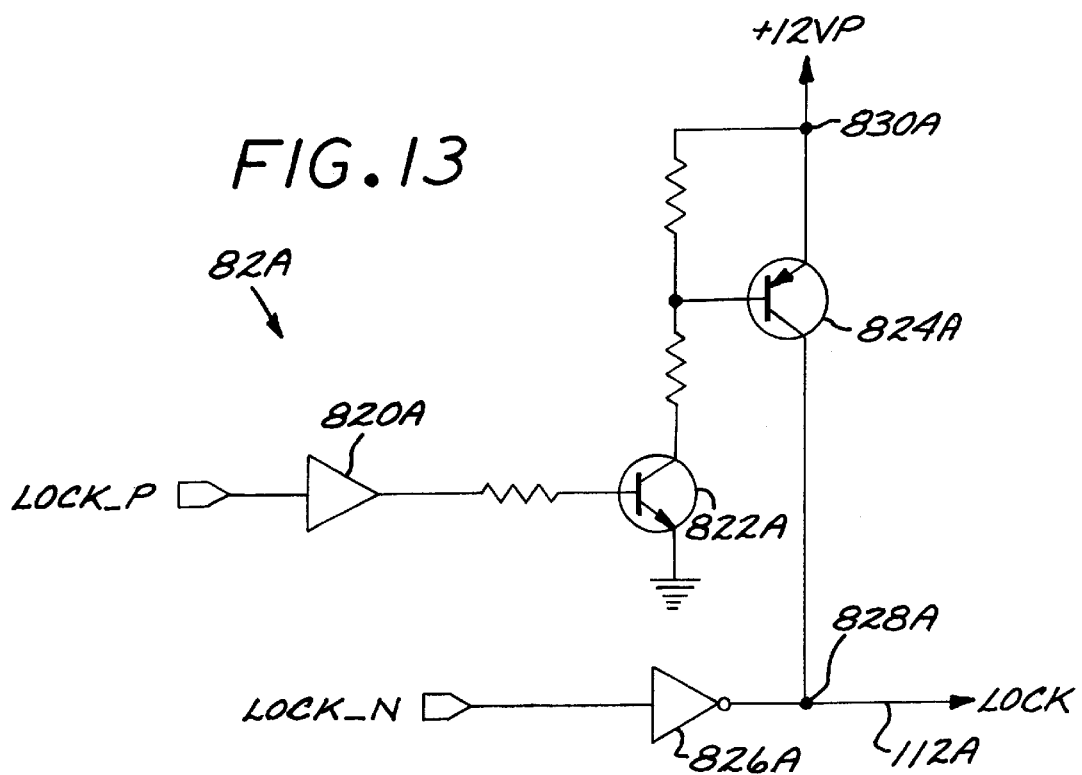
FIGS. 13 and 14 illustrate schematic circuit diagrams of programmable polarity door lock and unlock control signal circuits in accordance with the invention.
Figure 14:
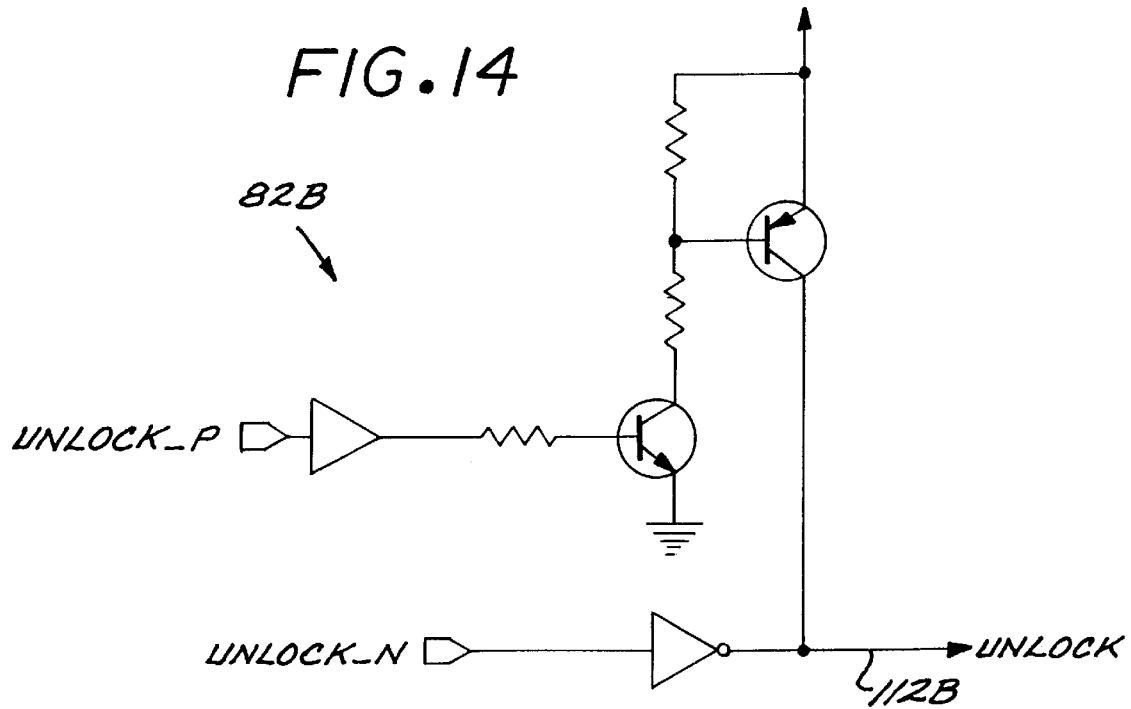

FIGS. 13 and 14 illustrate schematic circuit diagrams of programmable polarity door lock and unlock control signal circuits 82A and 82B comprising the output signal conditioning circuit 82. These circuits are responsive to output signals from the controller 74 to select the polarity of the door locking system control signals. Turning first to FIG. 13, the door lock circuit 82A responds to two output control signals from the controller 74, LOCK_P and LOCK_N, to generate a control signal LOCK (112A) sent to the door locking system 120. The LOCK_P signal activates a positive polarity LOCK signal; the LOCK_N signal activates a negative polarity (ground) LOCK signal. The LOCK_P signal has an active low state; the LOCK_N signal has an active high state. The LOCK_P signal drives an invertor 820A, whose output controls the base of transistor 822A. The transistor 822A in turn controls the gate bias circuit for the transistor 824A, whose emitter and collector are connected between node 830A at 12 volts and node 828A, the circuit output node from which the LOCK signal is taken. The LOCK_N signal drives invertor 826A whose output is connected to node 828A.

To generate a positive polarity LOCK signal, the controller issues an active LOCK_P signal while at the same time putting LOCK_N in an inactive state. As a result, the output of invertor 820A will be high, turning on transistor 822A, in turn biasing transistor 824A to the conductive state, so that node 828A is at 12 volts, i.e. a positive polarity control signal LOCK.

To generate a negative polarity LOCK signal, the controller 74 issues an active LOCK_N signal while at the same time putting LOCK_P in an inactive state. As a result, the output of invertor 826A will be low (ground) for an active negative polarity LOCK signal.

The unlock circuit 82B operates in identically the same manner, and so need not be described further. An active low UNLOCK_P signal results in a positive polarity UNLOCK signal; an active high UNLOCK_N signal results in a negative polarity UNLOCK signal.

Thus four output signals from the controller 74, LOCK_P, LOCK_N, UNLOCK_P, UNLOCK_N, are employed to programmably determine the polarity of the control signals provided to the door locking system 120.

Figures 15, 16:
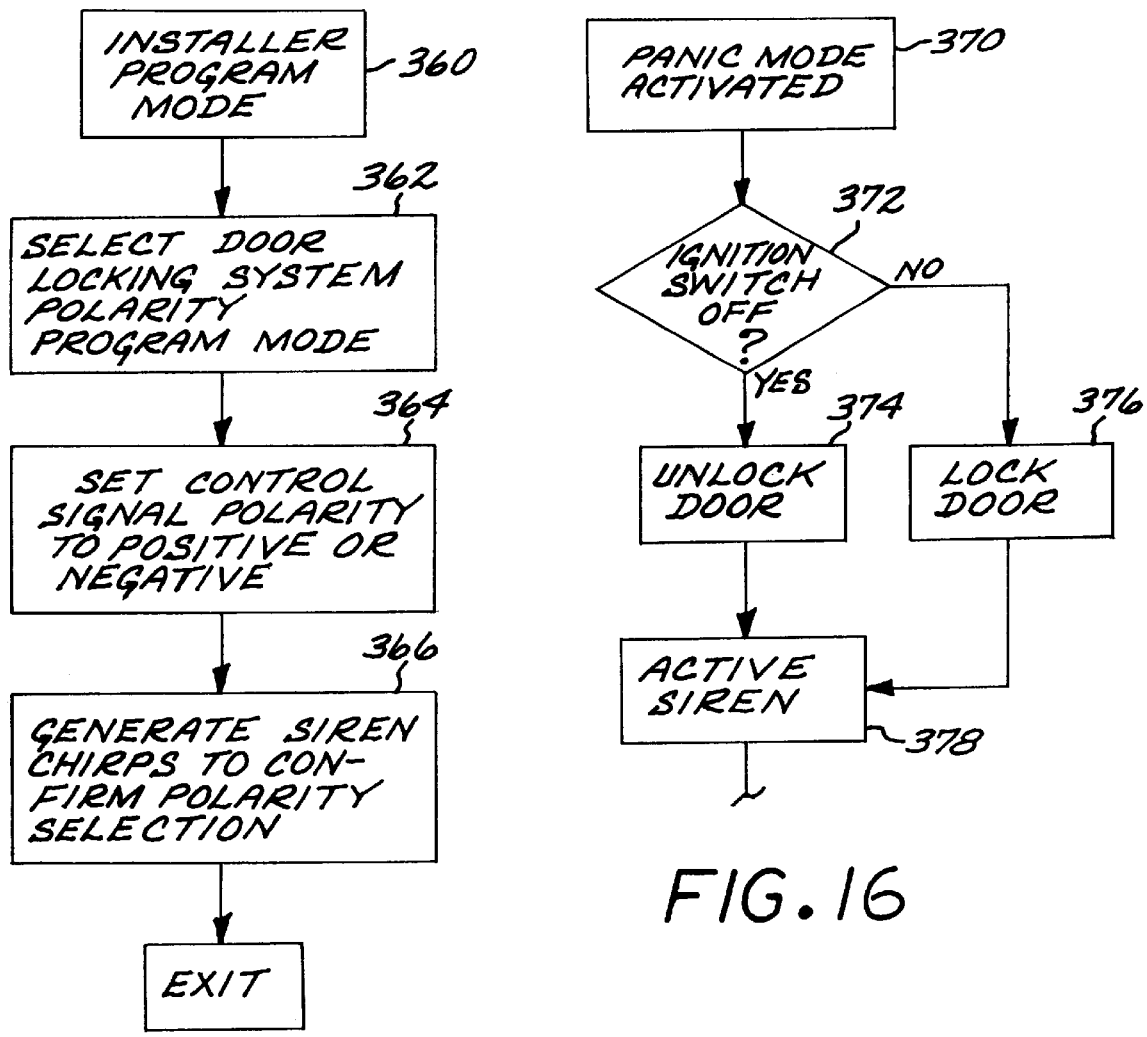
FIG. 15 shows an exemplary installer programming procedure to select the desired door lock system polarity.
FIG. 16 is a flow diagram illustrating the automatic door control with panic mode activation in accordance with the invention.

FIG. 15 shows a general installer programming procedure to select the desired door lock system polarity. This can be selected from an installer program mode menu, as shown in U.S. Pat. No. 4,922,224, FIGS. 15A and 15R, for example, using the valet switch as a data entry device to communicate with the controller. Once the installer program mode (360) is selected, the installer selects the door locking system polarity programming mode at step 362. The installer then programs the controller to set positive polarity or negative polarity, so that the controller will know which active control signals (LOCK_P, LOCK_N, UNLOCK_P, UNLOCK_N) to generate. As with all programmed data, this selection is stored in the non-volatile memory 76. To confirm the selected polarity, appropriate siren chirps are generated (step 366). This program mode will then be exited.

Intelligent Panic Mode.

This feature of the invention provides added personal security to the owner when the remote control panic button is activated. Conventionally, when the remote control panic button is activated, the security system siren is activated to warn passersby. In accordance with the invention, when the remote control panic button is activated when the owner is outside the vehicle, i.e. when the ignition switch is "off," the siren will sound and the doors will automatically unlock to permit the owner to quickly enter the vehicle without the need to fumble for keys. Conversely, if the remote control panic button is activated while the ignition switch is "on," say while the vehicle is stopped at a traffic light and the driver is threatened by an assailant, the siren will sound and all the doors will automatically lock to provide an extra measure of personal security to the owner.

FIG. 16 is an exemplary flow diagram of the panic mode security feature. When the panic mode is activated by the user (step 370), typically by activating a panic button on the transmitter, or by holding down the arm/disarm button for a length of time, the controller 74 checks the state of the ignition switch (step 372). If the ignition switch is off, the doors are automatically unlocked (step 374), and the alarm siren is activated (step 378). If the ignition switch is on, then the controller locks the doors (step 376) and activates the siren (step 378).

Vehicle Disable Relay Operation Mode Programming.

Another aspect of the invention is the capability of allowing the security system installer to program the starter and ignition interrupt relays to operate in either a normally open or a normally closed mode. The known security systems in use today are limited to only one unalterable mode. The normally closed mode permits the vehicle owner to drive the vehicle in the event that the control unit had to be removed for repair, but its security level is substantially reduced since a thief will be able to bypass the alarm by removing the system's fuse or cutting either the system power or ground wires. The normally open mode will keep immobilizing the vehicle even if the system's control unit is removed or any of its wires are cut. The normally open mode is clearly a much more secure mode, but may cause inconvenience in the event of malfunction, since it is impossible to determine in advance what a particular mode preference of a customer will be. The ability to program the operational mode of these engine immobilization relays to either mode gives both the owner and the installer the flexibility in choosing the appropriate mode at the time the system is installed.

Figure 17:
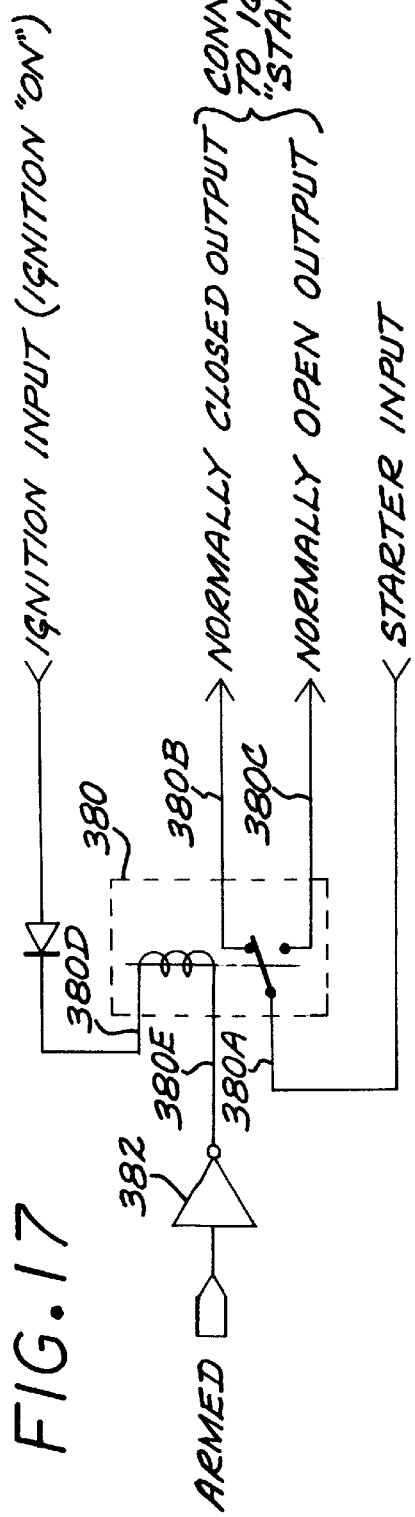
FIG. 17 shows a programmable starter disable circuit in accordance with an aspect of the invention.

FIG. 17 shows a programmable starter disable circuit in accordance with this aspect of the invention. The starter relay includes a terminal 380A connected to the vehicle starter solenoid. The relay, depending on its switch state, connects 380A to either terminal 380B or to terminal 380C. The relay coil operating the relay switch is connected to terminals 380D and 380E. Terminal 380D is connected to the ignition "on" contact to be connected to +12 volts when the ignition switch is turned on. Terminal 380E is connected to the output of invertor 382, whose input is driven by an output signal ARMED generated by the controller 74.

The installer has the choice of connecting either terminal 380B or terminal 380C to the ignition "start" switch to receive +12 volt only when the user is attempting to crank the engine by the starter motor. Terminal 380B is the normally closed output of the relay; terminal 380C is the normally open output of the relay.

The ARMED signal is active when the security system is armed. Its polarity is programmable, so that, depending on the installer programming of the polarity, the ARMED signal active state may be positive (+12 volts) or negative polarity (ground). The polarity will be programmed to be at the positive polarity state when armed in the case where the normally closed output 380B is in use. The polarity will be programmed to the negative polarity state when armed in the case where the normally open output 380C is in use.

The circuit operates in the following manner. Assume that the controller has been programmed to provide a positive polarity ARMED signal, and the terminal 380B is connected to the start switch. In the relay unenergized state, terminals 380A and 380B will be connected, since 380B is the normally closed relay output. When the system is disarmed, the relay will not be energized, and the starter motor can be cranked, since 380A and 380B are connected. When the system is armed, the invertor 382 inverts the positive ARMED signal, so that when the ignition switch is turned on, the relay is energized, connecting 380A to open terminal 380C. Thus the starter cannot be cranked. Assume now the controller is programmed to provide a negative polarity ARMED signal, and the start switch is connected to 380C. When disarmed, the relay can be energized by turning the ignition switch to on, due to operation of the invertor 382, thus connecting 380A to 380C. When the system is armed, the relay cannot be energized, and so the starter cannot be cranked.

While the starter relay 380 is shown in FIG. 17, a similar circuit arrangement can be employed to control an ignition interrupt relay which shorts or open circuits the engine ignition coil or points.

Figure 18:
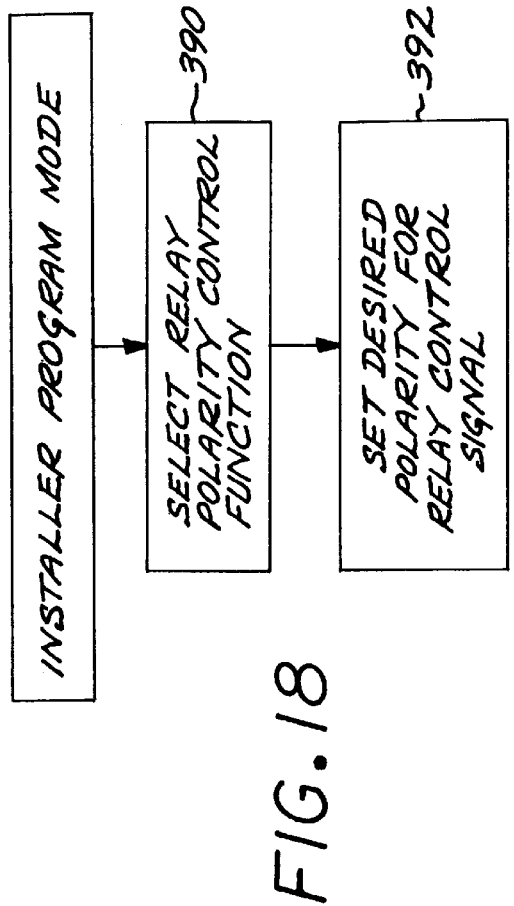
FIG. 18 illustrates the programming of the controller to set the relay control signal ARMED to the desired polarity to operate the relay comprising the circuit of FIG. 17.

FIG. 18 illustrates the programming of the controller to set the relay control signal ARMED to the desired polarity to operate the relay. With the system in an installer program mode, the installer selects the relay polarity control function for programming (step 392). The installer then sets the desired polarity according to how the relay has been wired, i.e. for normally open or normally closed operation. An exemplary installer programming mode is shown in U.S. Pat. No. 4,922,224, at FIG. 15R, and column 24, line 16, to column 24, line 28. The valet switch 90 is used in this exemplary embodiment to enter the program mode, select the installer programming menu, and then select the relay control signal polarity programming mode. This new mode can be added to the programming menu of FIG. 15R of the '224 patent.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An electronic vehicle security system, comprising:

an alarm;

apparatus for detecting intrusion attempts and generating intrusion signals in response to said detection;

circuitry for arming the system so that said alarm is activated in response to detected intrusion attempts;

circuitry for periodically flashing a light in accordance with a light energization duty cycle when the system is armed to provide a visual indication that the vehicle is protected by a security system;

a battery for supplying power to flash said light;

battery power conserving apparatus for conserving battery power, said apparatus including timer apparatus for timing the length of time said system has been armed, and apparatus for reducing the light energization duty cycle for said light upon expiration of a predetermined length of time since arming occurred.

2. The system of claim 1 wherein the circuitry for arming the system includes a transmitter for transmitting a coded signal and a receiver responsive to the transmitted signal.

3. An electronic vehicle security system, comprising:

an alarm;

apparatus for detecting intrusion attempts and generating intrusion signals in response to said detection;

circuitry for arming the system so that said alarm is activated in response to detected intrusion attempts;

circuitry for periodically flashing a light in accordance with a light energization duty cycle when the system is armed to provide a visual indication that the vehicle is protected by a security system;

a battery for supplying power to flash said light;

battery power conserving apparatus for conserving battery power, said apparatus including timer apparatus for timing the length of time said system has been armed, and apparatus for reducing the light energization duty cycle for said light upon expiration of a predetermined length of time since arming occurred, said battery power conserving apparatus further including apparatus for further reducing said light energization duty cycle upon expiration of a further predetermined length of time since arming occurred.

4. The system of claim 3 wherein the circuitry for arming the system includes a transmitter for transmitting a coded signal and a receiver responsive to the transmitted signal.

5. An electronic vehicle security system, comprising:

an alarm circuit for generating an alarm in the event of an intrusion attempt;

a controller for putting the system in an armed mode for protecting the vehicle, or in an unarmed mode permitting the vehicle to be operated;

vehicle disabling circuitry operable when the system is armed to prevent operation of the vehicle, said circuitry including a relay switch actuatable from the controller, and wherein the controller provides a relay control signal which sets the relay to operate in either a normally open or normally closed mode; and is a programming circuit for programming the controller to set the relay control signal to establish the mode in which the relay operates.

6. The system of claim 5 wherein said vehicle disabling circuitry is for disabling operation of the vehicle engine starter motor.

7. The system of claim 5 wherein said vehicle disabling circuitry is for disabling operation of the vehicle ignition system.

8. The system of claim 5 wherein said vehicle disabling circuitry is adapted to disable operation of the vehicle electric fuel pump.

9. The system of claim 5 wherein said relay switch includes a normally open output terminal and a normally closed output terminal, and wherein either said normally open output terminal or said normally closed output terminal, but not both said terminals, is connected to a vehicle circuit to be selectively disabled by said relay in a security system disabling mode, and wherein, in the event of a predetermined malfunction condition of the controller, said vehicle circuit is not put in a disabled condition if said normally closed terminal is connected to said vehicle circuit, and wherein, in the event of said predetermined malfunction of the controller, said vehicle circuit is disabled from operation if said normally open terminal is connected to said vehicle circuit.

10. The system of claim 5 wherein said controller is adapted to generate a relay control signal of a first polarity when programmed to a normally closed relay mode condition, and to generate a relay control signal of a second polarity when programmed to a normally open relay mode condition.

11. The system of claim 5 further comprising a valet switch mounted in the vehicle, and wherein said programming circuit includes said valet switch.

* * * * *